US007307536B2

(12) United States Patent
Shannon et al.

(10) Patent No.: US 7,307,536 B2
(45) Date of Patent: *Dec. 11, 2007

(54) PORTABLE DEPLOYMENT KIT FOR NESTED VISIBILITY

(75) Inventors: David L. Shannon, State College, PA (US); Steven J. Farrell, Sunnyvale, CA (US); Stephen J. Lambright, San Francisco, CA (US); Roderick E. Thorne, Palo Alto, CA (US); Blair B. LaCorte, Belvedere, CA (US); Ravindra U. Rajapakse, San Francisco, CA (US); Leo S. Chang, San Carlos, CA (US)

(73) Assignee: Savi Technology, Inc., Sunnyvale, CA (US)

( * ) Notice: Subject to any disclaimer, the term of this patent is extended or adjusted under 35 U.S.C. 154(b) by 12 days.

This patent is subject to a terminal disclaimer.

(21) Appl. No.: 11/265,831

(22) Filed: Nov. 2, 2005

(65) Prior Publication Data

US 2006/0144940 A1 Jul. 6, 2006

Related U.S. Application Data

(63) Continuation-in-part of application No. 11/010,188, filed on Dec. 9, 2004, and a continuation-in-part of application No. 10/841,368, filed on May 6, 2004, now Pat. No. 7,173,530.

(51) Int. Cl.

| | |
|---|---|
| *G08B 19/00* | (2006.01) |
| *G08B 5/36* | (2006.01) |
| *G06F 19/00* | (2006.01) |

(52) U.S. Cl. ............................... 340/572.8; 340/572.1; 340/5.92; 340/10.1; 340/825.49; 235/385

(58) Field of Classification Search ............ 340/572.8, 340/10.33, 10.1, 5.92, 825.49, 572.1; 235/385
See application file for complete search history.

(56) References Cited

U.S. PATENT DOCUMENTS 4,688,244 A 8/1987 Hannon et al.

(Continued)

OTHER PUBLICATIONS

"Intermec® Guide to RFID Reader Selection," Intermec Technologies Corporation, 2004, 6 pages.

(Continued)

*Primary Examiner*—Julie Bichngoc Lieu
(74) *Attorney, Agent, or Firm*—Fenwick & West LLP

(57) ABSTRACT

Systems and methods to provide multi-layer visibility of nested containers at a mobile checkpoint are disclosed. Thee systems include a portable deployment kit in communication with a nested container. The portable deployment kit can be contained in a durable carrying case having a total weight that is within military standards for carrying by one person and includes a handle. Inside, the carrying case can include foam or other material to protect internal components during transport and deployment. In use within the system, the portable deployment kit can serve as a self-contained checkpoint or site server for gathering necessary information from the nested container and uplinking for centralized data collection. In one embodiment, the portable deployment kit includes a label printer for updating an identification device on the nested container to reflect, for example, aggregation and deaggregation.

18 Claims, 11 Drawing Sheets

U.S. PATENT DOCUMENTS

| | | | |
|---|---|---|---|
| 4,750,197 | A | 6/1988 | Denekamp et al. |
| 5,565,858 | A | 10/1996 | Guthrie |
| 5,568,858 | A | 10/1996 | Thompson |
| 5,835,012 | A | 11/1998 | Wilk |
| 5,892,441 | A | 4/1999 | Woolley et al. |
| 5,959,568 | A | 9/1999 | Woolley |
| 6,148,291 | A | 11/2000 | Radican |
| 6,211,781 | B1 | 4/2001 | McDonald |
| 6,662,068 | B1 | 12/2003 | Ghaffari |
| 6,714,121 | B1 | 3/2004 | Moore |
| 6,804,578 | B1 | 10/2004 | Ghaffari |
| 6,820,805 | B2 | 11/2004 | Stevens |
| 6,927,687 | B2 | 8/2005 | Carrender |
| 2001/0018672 | A1 | 8/2001 | Petters et al. |
| 2002/0029178 | A1 | 3/2002 | Wiederin et al. |
| 2003/0125980 | A1 | 7/2003 | Ribeiro |
| 2003/0227382 | A1 | 12/2003 | Breed |
| 2004/0100379 | A1 | 5/2004 | Boman et al. |
| 2004/0153344 | A1 | 8/2004 | Bui et al. |
| 2004/0177032 | A1 | 9/2004 | Bradley et al. |
| 2005/0109845 | A1 | 5/2005 | Ghaffari |
| 2005/0110636 | A1 | 5/2005 | Ghaffari |
| 2005/0288937 | A1 | 12/2005 | Verdiramo |

OTHER PUBLICATIONS

Notification of the International Search Report and Written Opinion, PCT/US04/11086, Sep. 5, 2006, 10 pages.

"RFID Overview: Introduction to Radio Frequency Identification," Intermec Technologies Corporation, 1999, pp. 1-7.

"Supply Chain RFID: How It Works and Why It Pays," Intermec Technologies Corporation, 2004, pp. 1-12.

Notification Of The International Search Report Or The Declaration and Written Opinion Of The International Searching Authority, PCT/US04/14206, May 19, 2005, 9 pages.

Authority, PCT/US04/14206, May 19, 2005, 9 pages.

Notification of Transmittal of the International Search Report and the Written Opinion of the International Searching Authority, or the Declaration, PCT Application No. PCT/US04/15166, Sep. 6, 2005, 6 pages.

Notification of Transmittal of the International Search Report and the Written Opinion, PCT/US04/41501, Nov. 3, 2005, 11 pages.

Notification of Transmittal of the International Search Report and the Written Opinion, PCT/US04/14192, Jan. 18, 2006, 8 pages.

"Guidance from AIM Global's RFID Expert Group: Proposed Guidelines for the Use of RFID-Enabled Labels in Military Logistics: Recommendations for Revision of MIL-STD-129," AIM Global, May 13, 2005, 39 pages.

"RFID Products Requirements for the Savi Total Asset Visibility Portable Deployment Kit," 2004, Savi Technology, Inc., 25 pages.

"Savi® Portable Deployment Kit," Active RFD Technology, Savi Technology, 1 page.

U.S. Appl. No. 11/084,126, "Two-Phase Commit Synchronizing Seal State," 46 pages.

U.S. Appl. No. 11/009,691, "Dual Mode Reader Device," 27 pages.

U.S. Appl. No. 11/084,126, "Two-Phase Commit Synchronizing Seal State," 46 pages, Mar. 17, 2005.

U.S. Appl. No. 11/009,691, "Dual Mode Reader Device," 27 pages, Dec. 9, 2004.

Notice of Preliminary Rejection, Korean Application No. 10-2006-7013827, Jul. 31, 2007, 12 pages.

PORTABLE DEPLOYMENT KIT FOR NESTED VISIBILITY

CROSS-REFERENCE TO RELATED APPLICATIONS

This application: claims priority under 35 U.S.C. § 120 as a continuation-in-part to U.S. patent application Ser. No. 10/841,368, filed on May 6, 2004, entitled Nested Visibility for a Container Hierarchy, by Stephen Lambright et al., now U.S. Pat. No. 7,173,530; and claims priority under 35 U.S.C. § 120 as a continuation-in-part to U.S. patent application Ser. No. 11/010,188, filed on Dec. 9, 2004, entitled Item Level Visibility of Nested and Adjacent Containers, by Stephen Lambright et al., the entire contents of each being herein incorporated by reference.

BACKGROUND OF THE INVENTION

1. Field of the Invention

This invention relates generally to tracking containers and their contents and, more specifically, to providing item-layer visibility and verifying manifest information by interrogating one layer within a logistical hierarchy of multiple heterogeneous layers of containers.

2. Description of Related Art

Ever-increasing global trade underscores a modern global economy which depends on goods transported in a global supply chain. Generally, a global supply chain is a network of international suppliers, manufacturers, distributors, and other entities that handle goods from their component parts to consumer consumption. For example, semiconductor testing equipment is exported from the United States to Taiwan, where semiconductors are processed and then sent to Malaysia for assembly into computers. Subsequently, the computers are shipped to warehouses in the United States, and ultimately, to consumer outlets for consumption.

However, current tracking systems have difficulty tracking container contents because goods are nested within several containers during shipping. For example, in terms of a nesting as defined by the ISO (International Standards Organization) item layers are packed into package layers, which are in turn stored in carton layers. Several carton layers are stored in a unit load layers, and several unit load layers are stored in container layers. Note that "container" is used here in a broader sense that includes each ISO layer and other enclosures. A vehicle transports several container layers at a time. Thus, an operator can only assume that an item is on a vehicle based on static nesting information collected during packing. Accordingly, if the good were stolen during shipment, or lost by being shipped to a wrong location, it is not possible to discover the missing good until each layer of container is opened at a consignee.

A related problem is that current tracking systems have no real-time information for tracking container contents, especially at the item-layer. Because physical contents travel separately from data about the contents, the tracking system is not able to provide dynamically verified information about contents. A port operator needing to know the contents of the container must log-in to the tracking system to retrieve static information. Moreover, the data about contents is often delayed and, thus, the operator may not even be able to retrieve some information.

Additionally, many checkpoints are only capable of tracking in through paths in the global supply chain that are static. The stationary checkpoints are set up in a persistent configuration and communicate with tags passing within range.

However, in environments with unpredictable asset movement, such as military operations, stationary checkpoints are generally unavailable, and lack the communication facilities and mobility to be set up on-the-fly.

Therefore, what is needed is a robust and mobile system providing nested visibility of a hierarchy of associated containers. The solution should further provide item-layer visibility and end-to-end tracking of goods within a global supply chain.

SUMMARY OF THE INVENTION

The present invention meets these needs with systems and methods to provide multi-layer visibility of nested containers at a mobile checkpoint. The systems can further provide a virtual warehouse enabled by item-layer visibility that tracks individual items end-to-end through a global supply chain. Thus, a central system can quickly and easily gather information about each of the associated containers having heterogeneous automatic identification technology by interrogating any one of the layers.

In some embodiments, the systems include a portable deployment kit in communication with a nested container. The portable deployment kit can be contained in a durable carrying case having a total weight that is within military standards for carrying by one person and includes a handle. Inside, the carrying case can include foam or other material to protect internal components during transport and deployment. In use within the system, the portable deployment kit can serve as a self-contained checkpoint or site server for gathering necessary information from the nested container and uplinking for centralized data collection. In one embodiment, the portable deployment kit includes a label printer for updating an identification device on the nested container to reflect, for example, aggregation and deaggregation.

In some embodiments, the nested container associates itself with neighboring containers to form a relative hierarchy of logistical units. The relative hierarchy accounts for containers of higher layers and containers of lower layers. Preferably, a nested container at the highest layer outputs the relative hierarchy in response to interrogations, however, any layer can do so. In some embodiments, the identification device on the nested container acts as an agent by autonomously gathering and processing information for the central system. The identification device provides visibility through a variety of automatic identification technologies such as active or passive RFID (Radio Frequency IDentification) tags, bar codes, EPC (Electronic Product Code) compliant tags, or any other devices capable of communicating its identification information. By automatically sending hierarchy information to the central system at, for example, checkpoints in a global supply chain, or in between checkpoints, with a satellite, the identification device provides item-layer visibility. In one embodiment, the nested container automatically verifies AMR (Automated Manifest Rule) information by downloading from the central system and comparing to visible items.

In some embodiments, the identification device comprises an association module. The association module establishes a relative hierarchy of lower-layer containers, down to the item-layer, and upper-layer containers. Example layers include an item layer, a unit load layer, an intermodal container layer, and the like. To establish the hierarchy, the association module sends interrogation signals to neighboring containers in order to retrieve identification information and layer information. The information can relate to both individual information of the responding container and hierarchical information about neighbors to the responding container. Also, the association module sends its own identification information and layer information responsive to received interrogation signals. From a nested container, the association module outputs the relative hierarchy to, for example, a site server or agent using a hand-held device.

In some embodiments, the identification device further comprises a communication port to send and receive identification and/or layer information. The communication port comprises, for example, an RFID transceiver operating at a 433-Mhz frequency.

The features and advantages described in this summary and the following detailed description are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE FIGURES

FIG. 7 is a block diagram illustrating an identification device according to some embodiments of the present invention.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTIONS OF THE PREFERRED EMBODIMENTS

A system and method for nested visibility at a mobile checkpoint are disclosed. The system according to some embodiments of the present invention is set forth in FIGS. 1-8, and methods operating therein, according to some embodiments of the present invention, are set forth in FIGS. 9-10.

Figure 1:
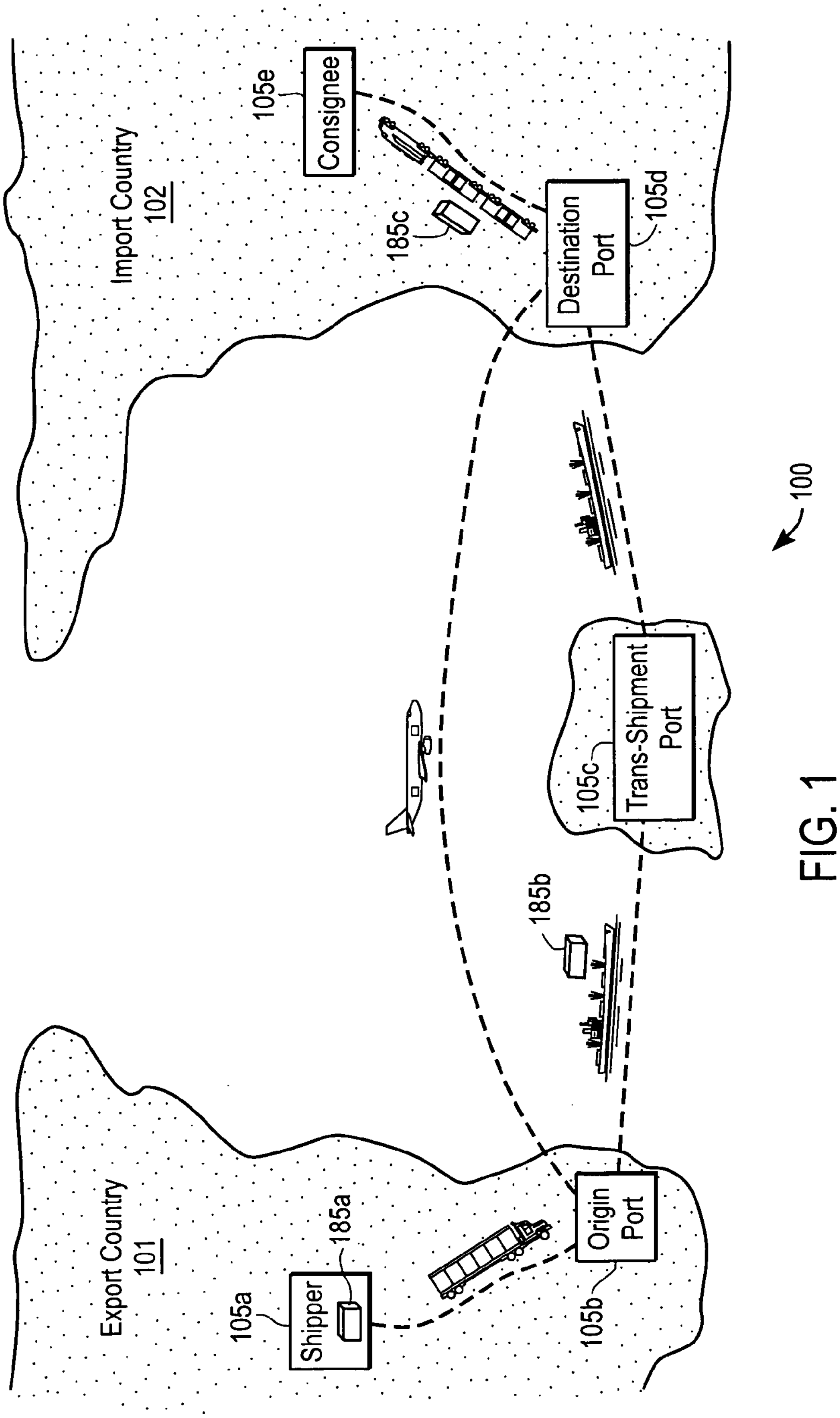
FIG. 1 is a schematic diagram illustrating an exemplary global supply chain according to one embodiment of the present invention.

FIG. 1 is a schematic diagram illustrating an exemplary global supply chain 100 including nested containers 185 according to one embodiment of the present invention. Note that FIG. 1 is merely an example global supply chain 100 that can have various geographical configurations, modes of transport, etc. within the scope and spirit of the present invention. The global supply chain 100 comprises a shipper 105*a*, an origin port 105*b*, a transshipment port 105*c*, a destination port 105*d*, and a consignee 105*e*.

The global supply chain 100 is used by a network of international suppliers, manufacturers, distributors, and other entities that handle goods from their component parts to consumer consumption. Accordingly, nested containers 185 and other cargo pass through the network points, checkpoints, ports, etc. The shipper 105*a* and the consignee 105*e* can be direct or indirect partner entities or units within a single entity exchanging a container though a trade route. For example, a manufacturer sends computer components to an assembly plant by truck freight, which in turn ships assembled computers to a warehouse. The origin and destination ports 105*b-c* can be a shipping dock, an airport, a customs agency, an NVOCC (Non-Vessel Operating Common Carrier) or any other entity that sends and/or receives goods over a trade route. An internal supply chain is a similar network operated by a single entity or closely-associated entities At a high-level, the shipper 105*a* can transport a nested container 185 to the consignee 105*e* via one of many trade routes. As a first mode of transportation, a truck transports the nested container 185 from the shipper 105*a* to the origin port 105*b*. As a second and a third mode of transportation, a first vessel and a second vessel transport the nested container 185 from the origin port 105*b* to the destination port 105*d* with a transfer at a transshipment port 105*c*. As a fourth mode of transportation, a freight train transports the container to the consignee 105*e*. In the case of international transportation, governmental agencies of the corresponding countries 101, 102, such as a Customs and National Security Agencies, exercise oversight over components of the primary network while private parties exercise oversight over components of the extended network. Note that, however, in one embodiment, the transportation occurs within the borders of a single country. As such, exporting and importing is between intranational geographical locations (e.g., between two states, cities, provinces, etc.) overseen by, for example, a security agency or an intranational governmental agency. Problematically, checkpoints cannot easily gather information about typical containers having other containers layered therein.

The nested container 185 addresses this visibility problem. The nested container 185 acts as an agent by autonomously gathering and processing information for presentation to the central system. The nested container 185 associates itself with neighboring containers to form a relative hierarchy of logistical units. The relative hierarchy accounts for containers of higher layers and containers of lower layers. Preferably, a nested container 185 at the highest layer outputs the relative hierarchy in response to interrogations, however, any layer can do so. In one embodiment, the nested container 185 enables a master status upon determination that it is at the highest layer. In another embodiment, the nested container 185 updates the relative hierarchy upon detecting changes in composition (e.g., when a previously nested container fails to respond to a periodic poll).

As used herein, "layers" within the hierarchy can be defined in a variety of ways. Generally, each layer is capable of identifying itself in response to an interrogation, and is defined relative to other layers. A lower layer is capable of being contained within a higher layer. For example, an item or good at a first layer is contained within its packaging at a second layer, and a packaging is contained within a carton of layer three. A spectrum of layers can extend from an item and at the lowest layer to a vehicle at the highest layer. Preferably, less capable automatic identification technologies, such as bar codes, are within lower layers, and more capable automatic identification technologies, such as active RFID (Radio Frequency IDentification) tags, are within higher layers. In one embodiment, the nested container 185 comprises a smart container as described in U.S. patent application Ser. No. 10/841,407.

As the nested container 185 travels on its route through the global supply chain 100, it may be interrogated at different checkpoints. When a truck is unloaded at the origin port 105*b*, pallets that were once associated can become separated and possibly reassociated. Since the truck is no longer the highest layer of the hierarchy, the nested containers 185 of relatively lower layers are able to provide similar information to an interrogator. Further embodiments of nested containers 185 and methods operating therein are described in below.

Figure 2:
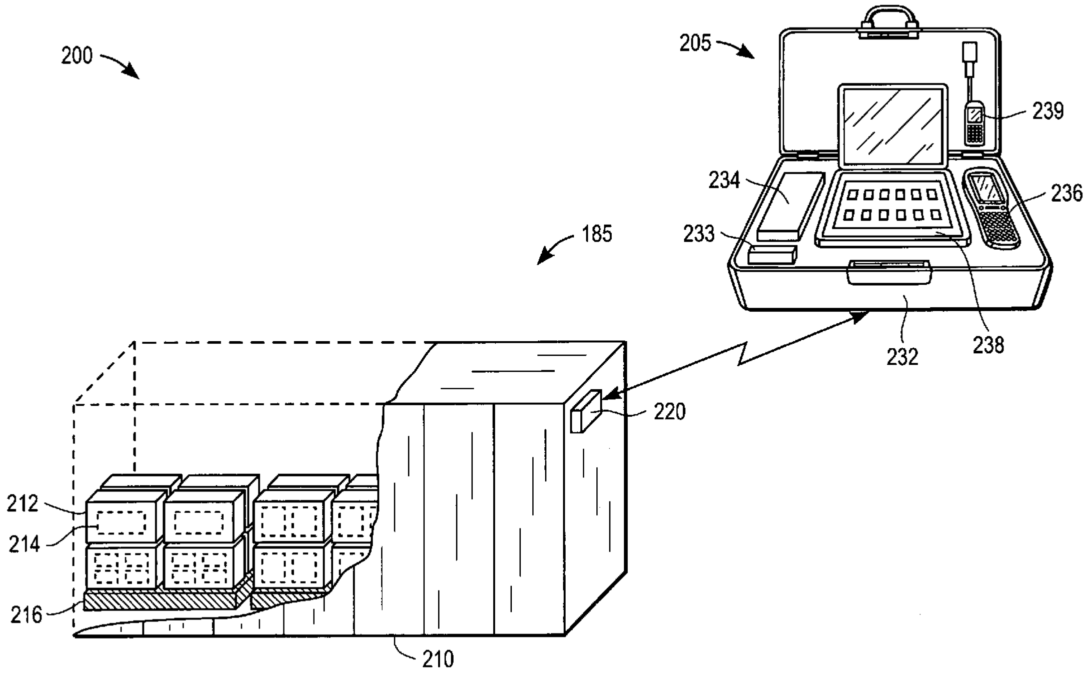
FIG. 2 is a schematic diagram of a system for providing nested visibility according to one embodiment of the present invention.

FIG. 2 is a schematic diagram of a system 200 for providing nested visibility according to one embodiment of the present invention. The system comprises a portable deployment kit 205 and a nested container 185 having an identification device 220. Generally, the portable deployment kit 205 can retrieve hierarchy information from one or more nested containers 185 in the system 100.

The portable deployment kit 205 can store components within a carrying case 232. The carrying case 232 can be formed from metal, hard plastic, or other durable materials for rugged environments. For example, the carrying case 232 can protect internal components in extreme weather conditions, during loading and unloading, and in other stressful environments. In one embodiment, the carrying case 232 has a total weight that is within military standards for carrying by one person and includes a handle. Inside, the carrying case 232 can include foam or other material to protect internal components during transport and deployment. In use within the system 200, the portable deployment kit 205 can serve as a self-contained checkpoint or site server for gathering necessary information from the nested container 185 and uplinking for centralized data collection. In one embodiment, additional wired connections are provided to provide AC power and wired communications for use as necessary. The portable deployment kit 205 can be operational with the lid open or closed. In the embodiment shown, the carrying case 232 contains a stationary reader 233 and a mobile reader 236 (can also be writers), a host system 238, a label printer 234, an external unit 239, and a power source (not shown).

The stationary reader 233 can be in wireless communication with identification device 220 (e.g., by radio communication), and can be in communication with the host system 238 (e.g., via a serial cable or a USB cable). The stationary reader 233 can comprise, e.g., a Savi Mobile Reader 650P by Savi Technology, Inc. of Sunnyvale, Calif., that is mounted to or integrated with the carrying case 232. The stationary reader 233 can process information relating to a hierarchy of containers received from the identification device 220 of the nested container 185. In one embodiment, the stationary reader 233 comprises a transceiver that can also send information and commands to the identification device 220.

The mobile reader 236 can be in wireless communication with the identification device 220 (e.g., by infrared communication). The mobile reader 236 can be, e.g., a PDT8146 by Savi Technology, Inc., that is coupled with the host system 238 by, e.g., a cord or short-range radio. The mobile reader 236 is capable of extending beyond the carrying case 232 to increased access with respect to the stationary reader 233. For example, the mobile reader 236 can be extended to close-range of a bar coded label. In one embodiment the mobile reader 236 can be completely deployed from the carrying case 232 (i.e., have no communication channel), and then synchronize information upon reengagement with a cradle. The mobile reader 236 is discussed in greater detail below.

The host system 238 can be in communication with the stationary reader 233 and mobile reader 236 as described, and be in communication with the external unit 239 and the printer 234. The host system 238 can be a laptop computer (e.g., Itronix Laptop) or other processing device capable of mobile deployment. The host system 238 can be configured for collecting and storing localized information from input devices (including manually input information). The host system 238 can also collect location information from the external unit 239 using, e.g., SATCOPM/GPS or other location technologies. The host system 238 can include software for asset tracking as a local server and/or as a client to centralized data collections. For example, the host system 238 can aggregate and/or deaggregate containers at a checkpoint where equipment is loaded and unloaded. In another example, the host system 238 can determine the contents of the nested container 185 and print a descriptive label. In another example, the host system 238 retrieves a location from the external unit 239 to associate with inventory for reporting to centralized data collections that track assets on a regional level. The host system 238 is described in greater detail below.

The label printer 234 can output labels used for identifying inventory in the nested container 185. In one embodiment, the label printer 234 outputs bar coded labels or labels with embedded RFID devices, thereby generating the identification device 220 in real time with up-to-date information. In one embodiment, the label printer 234 outputs labels in conformance with military standards such a MIL-STD-129 which describes military marking for shipment and storage, NATO standards, EPC standards or ISO/IEC standards. Between checkpoints, the nested container 185 may become aggregated or deaggregated with other containers. For example, a set of boxes can be loaded onto a pallet, and the pallet can be added to a ship container of other pallets. The label printer 234 can print a label that reflects the changes by, for example, printing a label for the pallet which identifies boxes stored thereon.

The nested container 185 is an example of a hierarchy of containers. At the highest layer, the nested container 185 comprises a container 210. The nested container contains a nested pallet 216 holding nested containers 212 with nested items 214. The identification device 220 is in communication.

Figure 3:
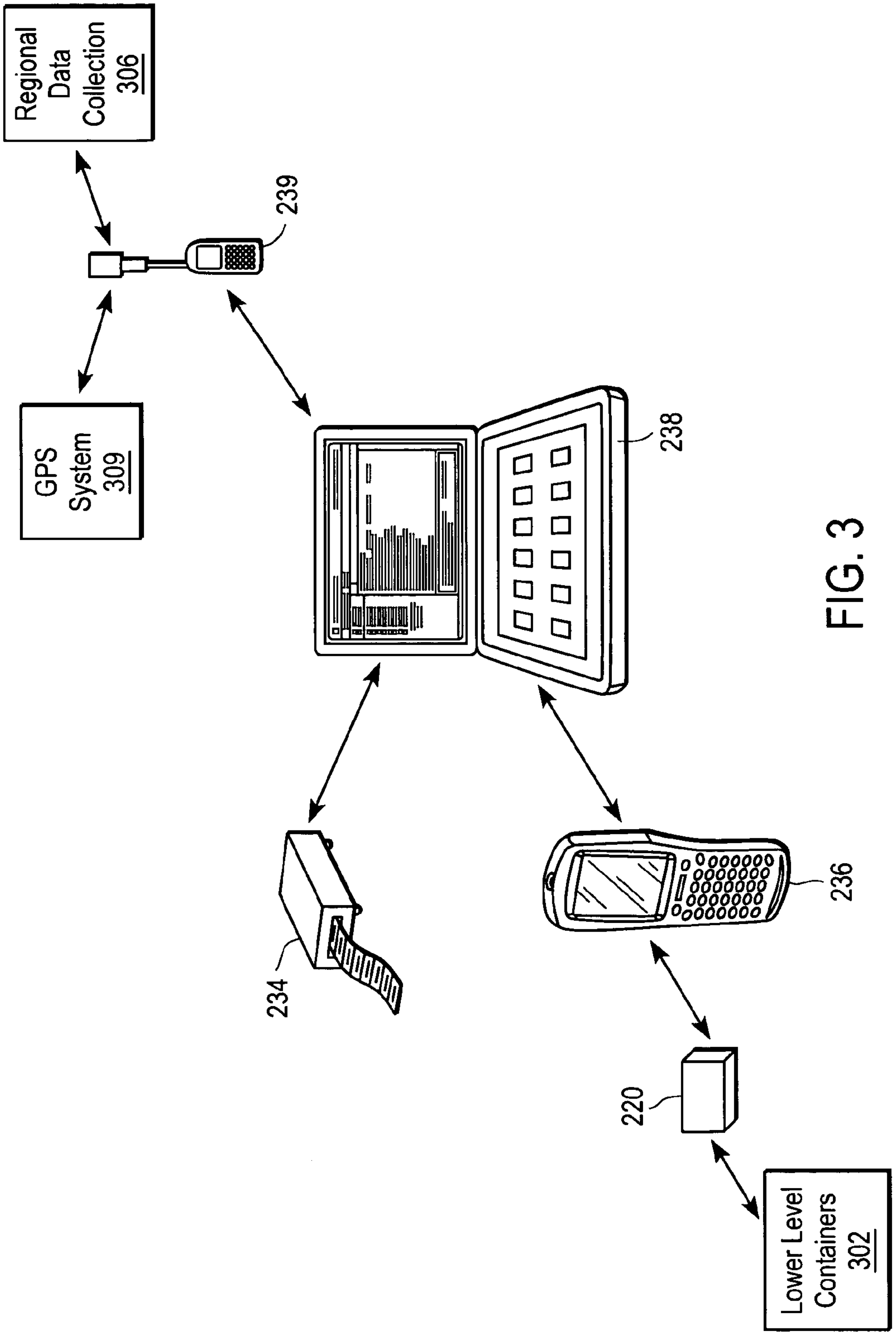
FIG. 3 is a schematic diagram illustrating an exemplary data path for components of the system according to one embodiment of the present invention.

FIG. 3 is a schematic diagram illustrating an exemplary data path for components of the system 100. The identification device 220 collects information from other identification devices associated with lower level containers 302. The lower level containers 302 can transmit information such as an identification code, contents, and hierarchy information for processing and/or storing by the identification device 220. The mobile reader 236 retrieves information from the identification device 220 for input to the host system 238 (either in real time or upon synchronization). The host system 238 exchanges data through the external unit 239, with a GPS system 309 for obtaining location information, and with a regional data collection 306 for downloading and uploading inventory and tracking information. Additionally, the host system 238 can send information to the label printer 234.

Figure 4:
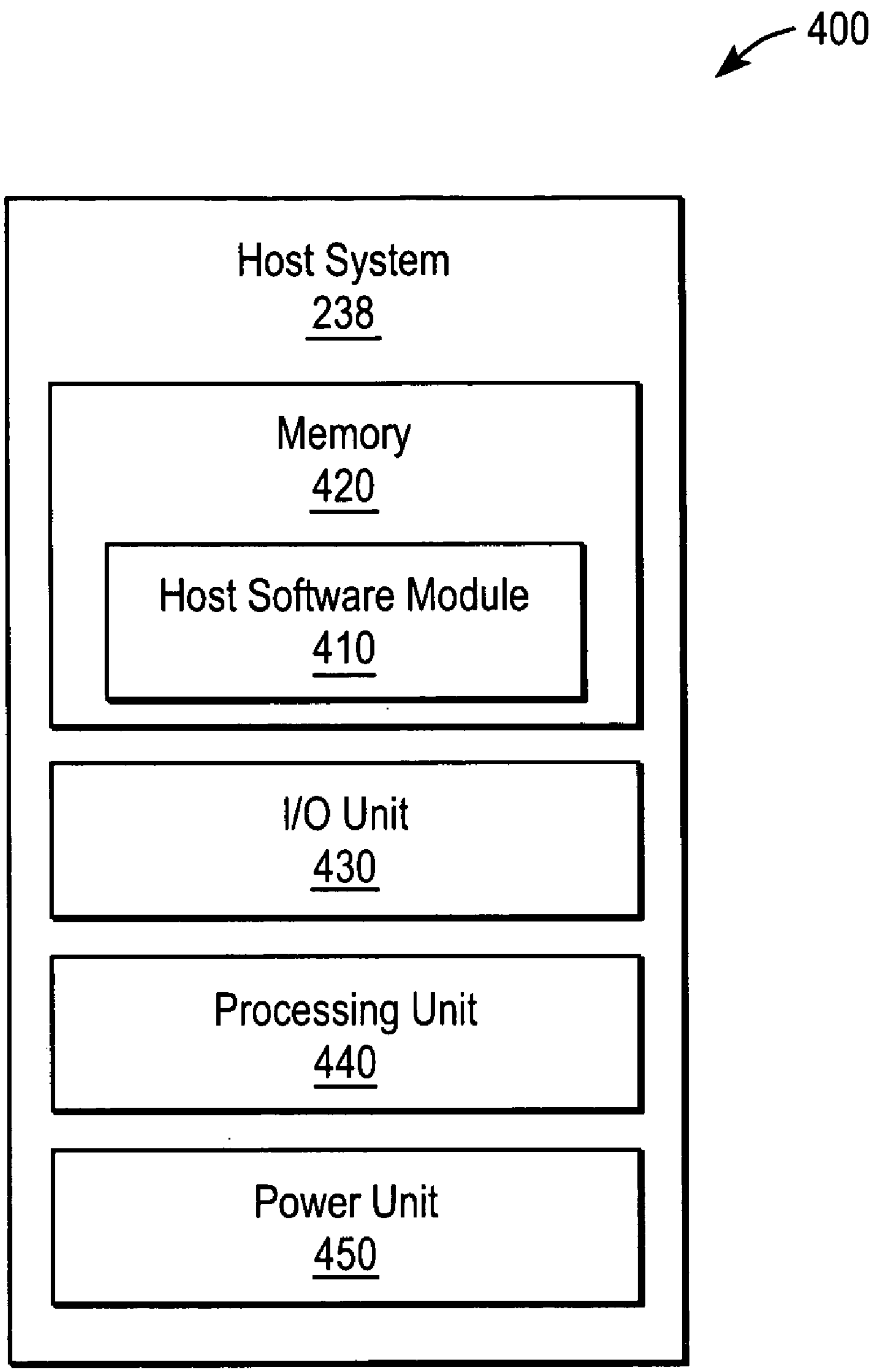
FIG. 4 is a block diagram illustrating a host system according to one embodiment of the present invention.
Figure 5A:
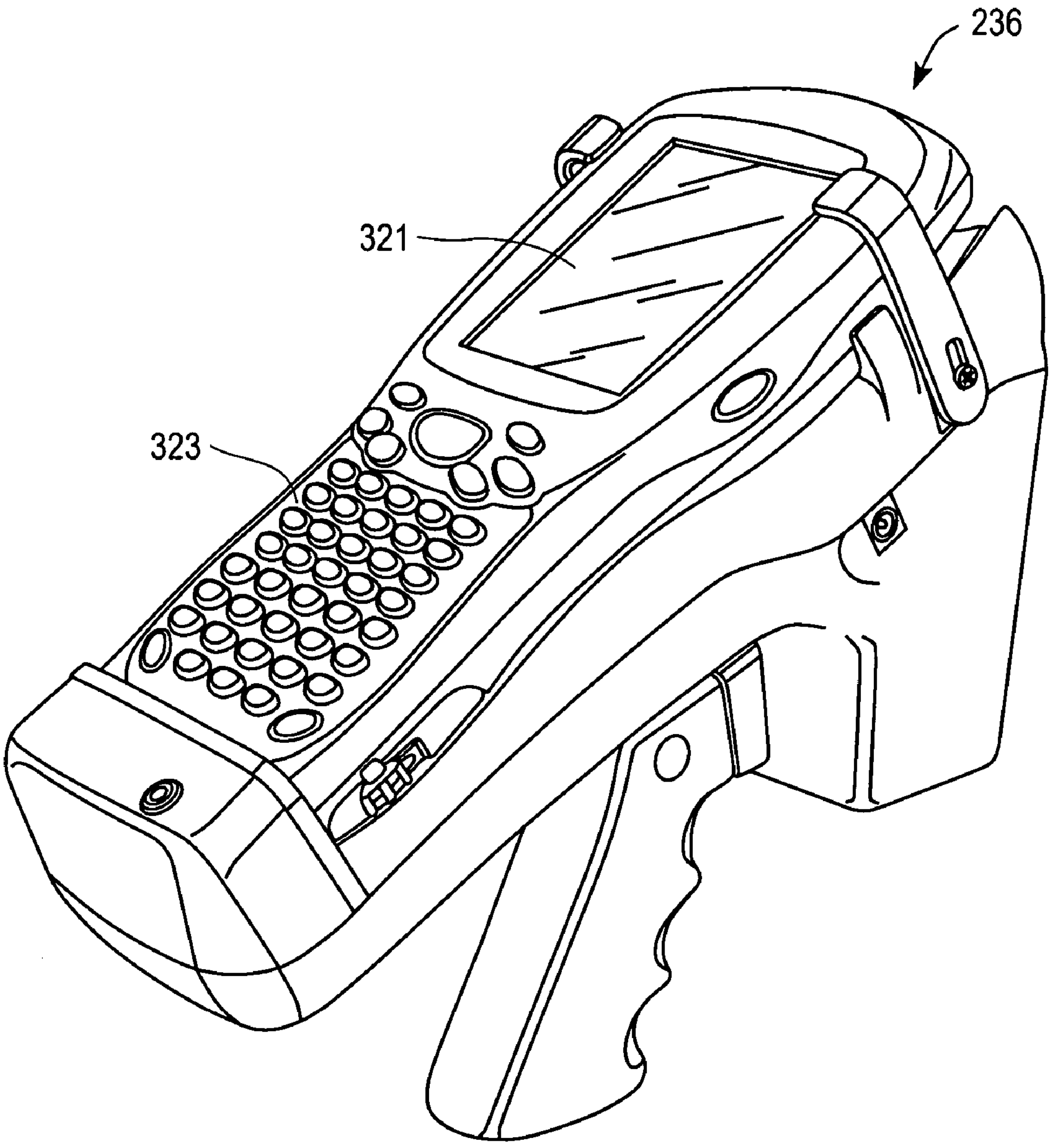
FIGS. 5A-B are schematic and block diagrams illustrating a mobile reader according to some embodiments of the present invention.
Figure 5B:
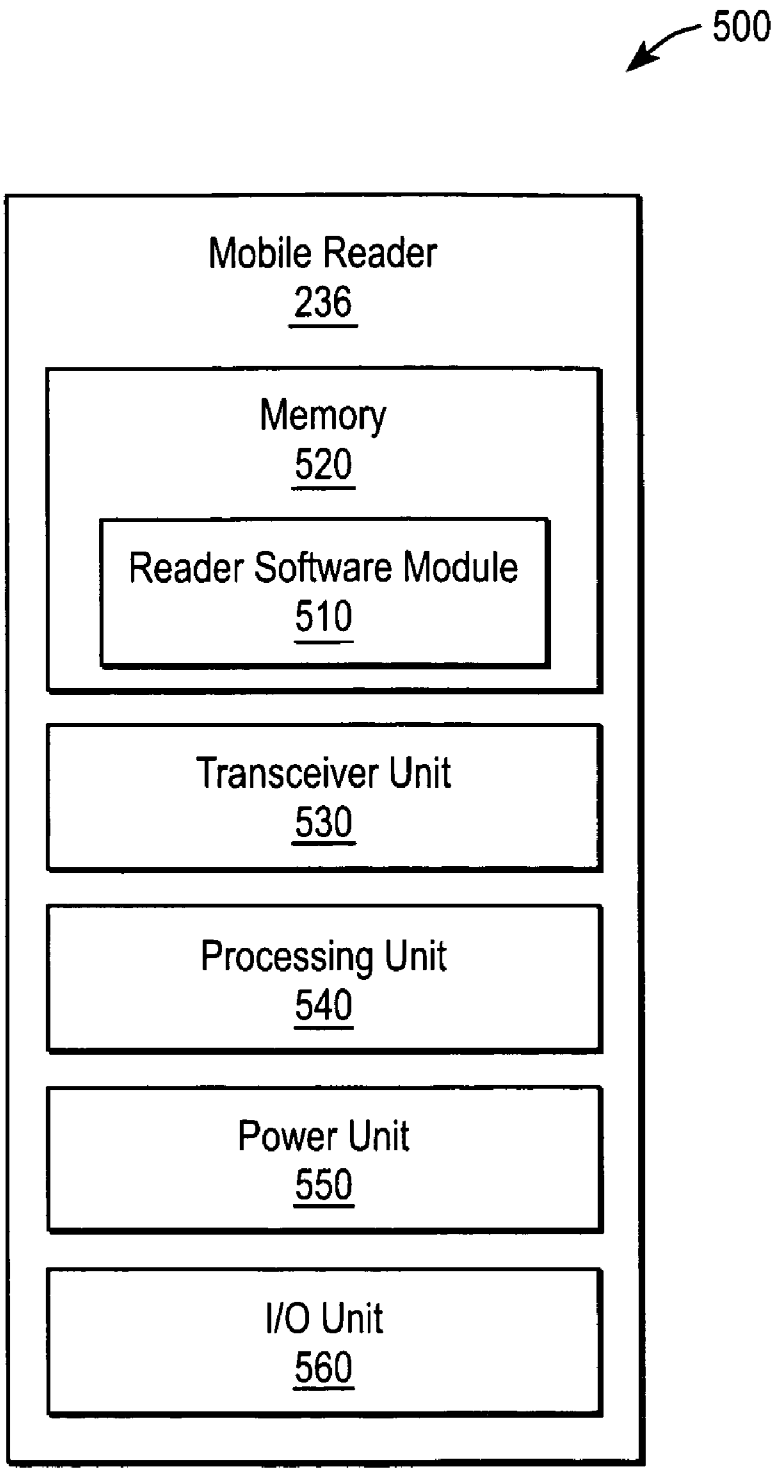

FIG. 4 is a block diagram illustrating a host system 238 according to one embodiment of the present invention. The host system 238 comprises a memory 420, an I/O unit 430, a processing unit 440. The memory 420 can be any volatile or non-volatile storage device capable of storing program instructions and/or data. In one embodiment, the memory 420 includes a host software module 410 comprising, for example, asset tracking software, inventory management software, security state software, or software that determines a relative hierarchy within the nested container 185. The I/O unit 430 includes input and output connectors for data communications with other components (e.g., stationary reader 233). The processing unit 440 comprises, for example, a central processing unit, a mobile processor, or a controller, and processes data associated with the host system 238. The power unit 450 can be a battery or other internal power source for providing power to the host system 238. FIG. 5A is a schematic diagram illustrating one embodiment of a mobile reader 236. The mobile tag reader 236 is detachable and includes a display screen 321 and keys 323 for data entry. FIG. 5B is a block diagram illustrating another embodiment of a mobile reader 236.

The mobile reader 236 of FIG. 5B comprises a memory 520, a transceiver unit 530, a processing unit 540, a power unit 550, and an I/O unit 560. The memory 520 can be any volatile or non-volatile storage device capable of storing program instructions and/or data. In one embodiment, the memory 520 includes a reader software module 510 to, for example, retrieve data from the identification device 220 and send the data to the host system 238. The transceiver unit 530 comprises, for example, one or more transmitters and receivers (e.g., RF transmitters and receivers) that are able to send and receive wireless signals for reading hierarchy information from the nested container 185, and for conveying that information to the host system 238. In one embodiment, the transceiver unit 530 includes transceivers for reading both active and passive tags as described in U.S. application Ser. No. 11/009,691. In another embodiment, the transceiver unit 530 includes transceivers for reading security information, such as seal states, from the nested container 185. The I/O unit 560 includes input and output connectors for data communications with other components (e.g., the display 321 of FIG. 5A). The processing unit 540 comprises, for example, a central processing unit, a mobile processor, or a controller, and processes data associated with the mobile reader 236. The power unit 550 can be a battery or other internal power source for providing power to the mobile reader 236.

Figure 6:
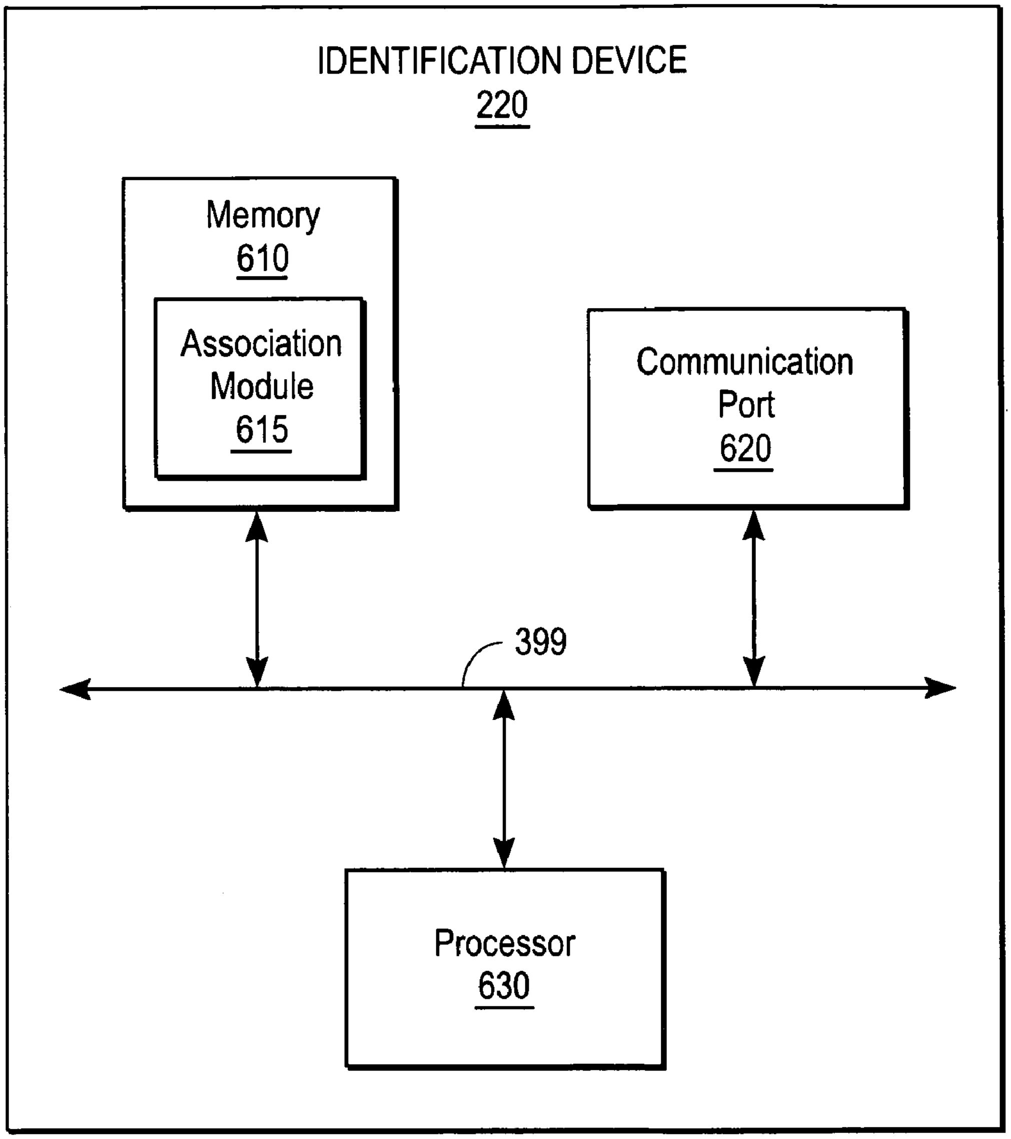
FIG. 6 is a block diagram illustrating an identification device according to one embodiment of the present invention.

FIG. 6 is a block diagram illustrating a representative identification device 220 according to one embodiment of the present invention. The identification device 220 comprises a memory 610, a communication port 620, and a processor 630, coupled in communication through a bus 399. The memory 610 can be any volatile or non-volatile device capable of storing program instructions and/or data. The memory 610 further comprises an association module 615. The association module 615 establishes the relative hierarchy of lower-layer containers and upper-layer containers. In operation, the association module 615 sends out an interrogation signal to identify associated nested containers 185. Subsequently, the association module 615 receives identification information and layer information. The identification information comprises, for example, a key that uniquely identifies the nested container 185. The layer information comprises, for example, explicit downloaded information, or implied information related to nested containers 185. The association module 615 uses the layer information to determine whether the nested container 185 is in the upper-layer or lower-layer and, further, a layer relative to other known nested containers 185. Additionally, the association module 615 responds to interrogatories with identification information and layer information concerning the container 220.

The communication port 620 comprises physical, logical, analog and/or digital communication channels necessary to, for example, send and receive identification information, layer information, and the like. For example, if the identification device 220 comprises an RFID device, the communication port 620 comprises an RF transmitter and receiver. The processor 630 comprises, for example, a central processing unit, a mobile CPU, a controller, or other device to execute instructions. The communication port 620 can also translate information between formats such as between a proprietary information format and EDI (Electronic Data Interchange). As can be seen, the configuration described in FIG. 6 is only an example, and can modified according to desired capabilities or container layer of the identification device 220.

Figure 7A:
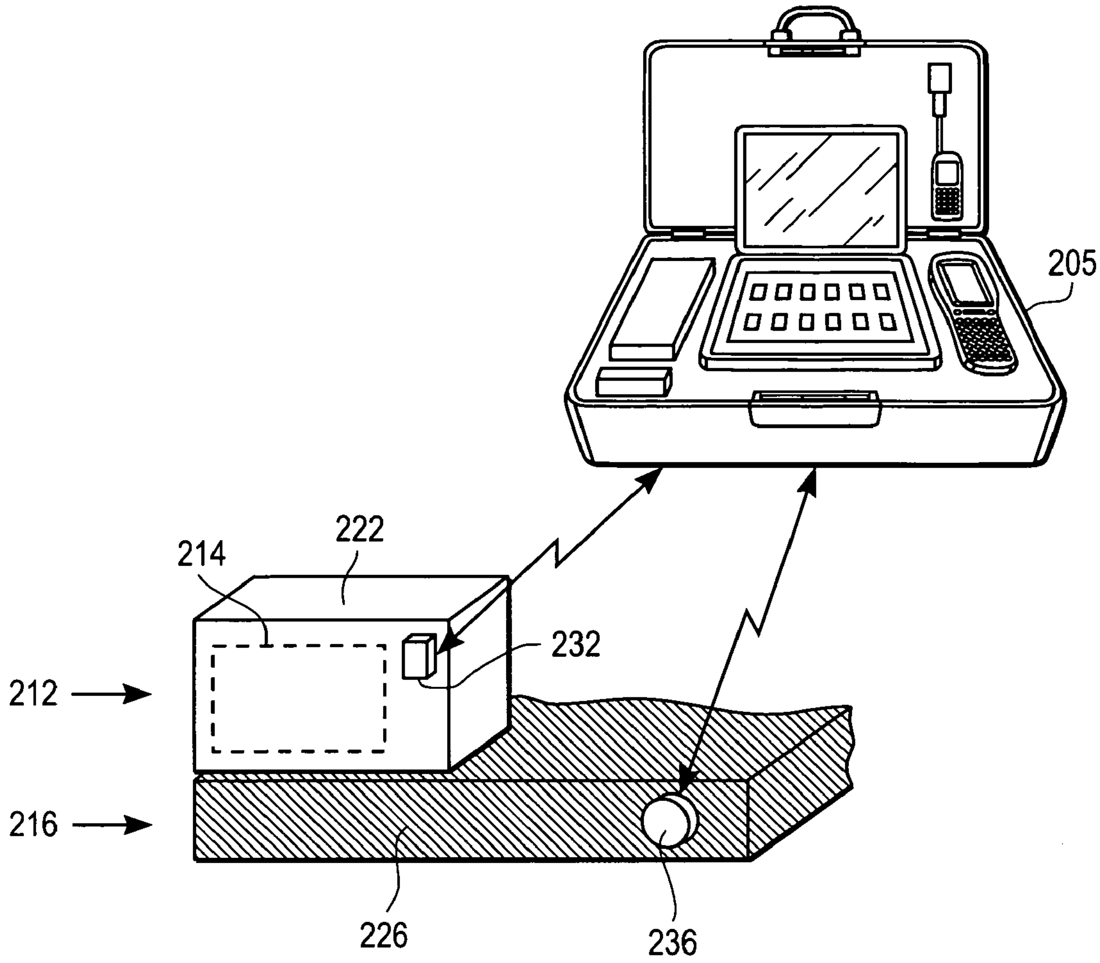
FIGS. 7A-B are schematic diagrams illustrating example physical layers within a container hierarchy according to some embodiments of the present invention.
Figure 7B:
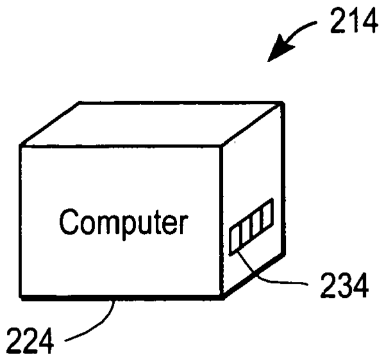

FIG. 7A illustrates the nested container 185 at a lower layer comprising a container 222 with an identification device 232. A nested pallet 216 as shown in this embodiment, is a platform for a group of nested containers 212 that is useful during, for example, movement by a forklift. The nested pallet 216 comprises a pallet 226 and an identification device 236. Both identification devices 232, 236 can be in communication with the portable deployment kit 205 through the mobile or stationary readers 233, 238, or be in direct communication. Also, FIG. 7B illustrates the nested container 214 at a lower layer relative to the nested container 212 comprising an item 224 with a bar code 244 or another inexpensive identification device.

As used herein, "containers" can comprise common enclosures referred to as, for example, goods, items, packages, cargo, intermodal containers, freight, boxes, and the like. Containers can also comprise ISO (International Organization for Standardization) standardized enclosures in the form of layers or units referred to as, for example, IMCs (InterModal Container), IBCs (Intermediate Bulk Container), RTCs (Reusable Transport Container), ULDs (Unit Load Devices), the layers described below with respect to FIG. 4, and the like. Note that the containers 210, 222, 224 are merely examples as it can vary in size, shape, and configuration (e.g., more than two doors).

The identification devices 232, 236 (and also 220 from FIG. 2) although at different layers, are each capable of independent communication with the portable deployment kit 205 (or other site server). Thus, the identification devices 220, 232 need not daisy chain information up a ladder as the portable deployment kit 205 can gather information from either source. In one embodiment, the identification devices 232, 236 automatically verify AMR (Automated Manifest Rule) information by downloading from the central system and comparing to visible items. As a result, the identification devices 232, 236 can verify AMR to a central security system, and inform an operator or agent as to whether correct goods are being loaded, unloaded, etc.

The identification devices 232, 244, 236 are coupled, attached, mounted, or otherwise associated with the containers 210, 222, 224 for identification. In one embodiment, the identification devices 232, 244, 236 although heterogeneous, are interoperable. For example, identification device 220 comprises an active RFID tag, identification device 232, 236 comprises a passive RFID tag, and identification device 244 comprises a bar code. Other types of identification devices 220 not herein described, such as EPC (Electronic Product Code) tags can also be used in some embodiments.

Figure 8:
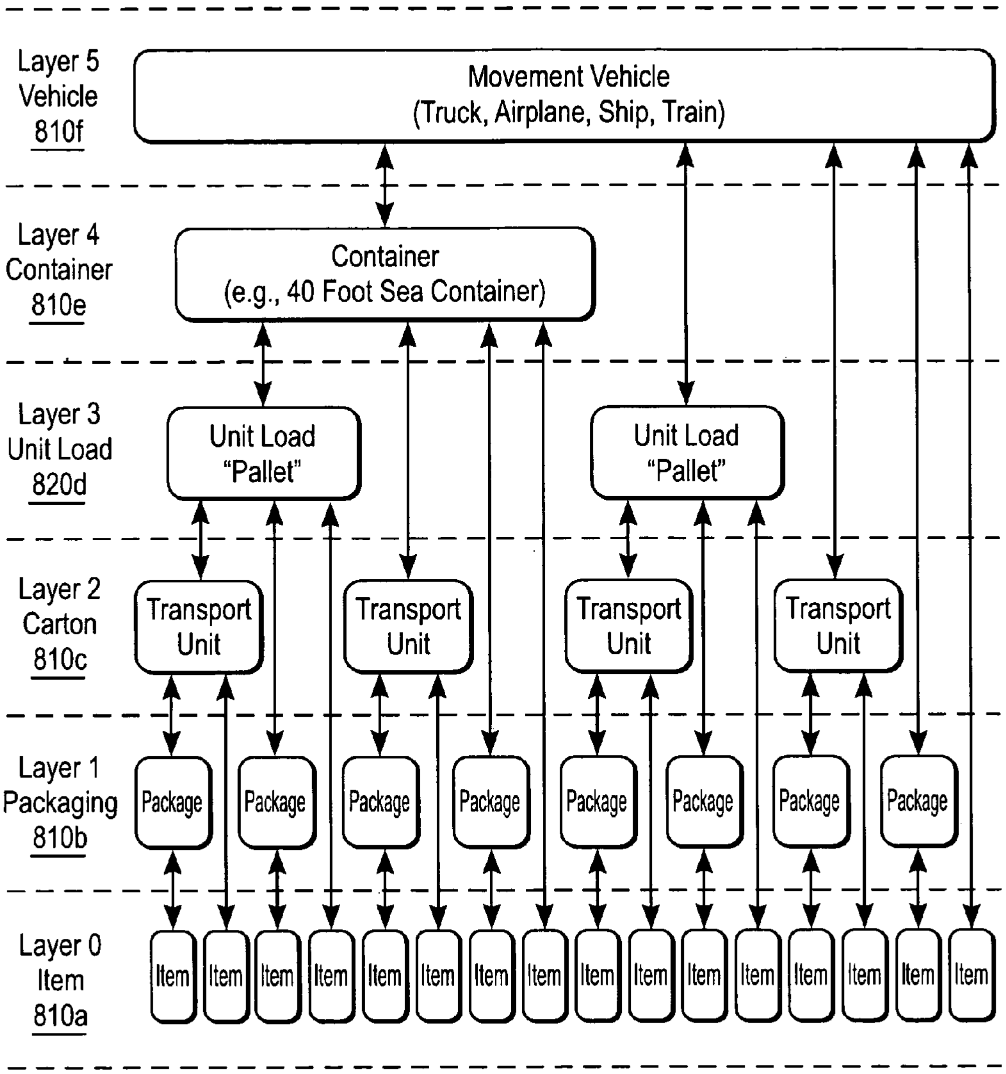
FIG. 8 is a block diagram illustrating ISO logistical layers within an example container hierarchy according to one embodiment of the present invention.

FIG. 8 is a block diagram illustrating ISO logistical layers within an example container hierarchy according to one embodiment of the present invention. The logistical layers or units include an item layer 810*a*, a packaging layer 810*b*, a carton layer 810*c*, a unit load layer 810*d*, a container layer 810*e* (not meant to redefine "container" as used herein), and a vehicle layer 810*f*. As shown in FIG. 8, each layer is capable of communicating identification information and layer information to each other layer in a many-to-many relationship to establish relative hierarchies. In one embodiment, layer information pertains to which logistical layer the nested container 185 belongs. In another embodiment, the container hierarchy uses non-ISO layers.

The item layer 810*a* comprises, for example, an item or good such as a computer with a serial number. The item can have a serial number or passive tag. The packaging layer 810*b* comprises, for example, a box used to enclose the item and its accessories. The packaging can have a bar code, UPC code, passive tag, or the like. The unit load layer 810*c* comprises, for example, one or more packages that are moved around together on a pallet. The unit layer 810*d* can have an active or passive tag. The container comprises, for example, a 40'×8'×8' metal box of one or more pallets. The container can have an internally or externally mounted active or passive tag. The vehicle layer 810*e* comprises, for example, one or more containers. The vehicle can have an active or passive tag.

Figure 9:
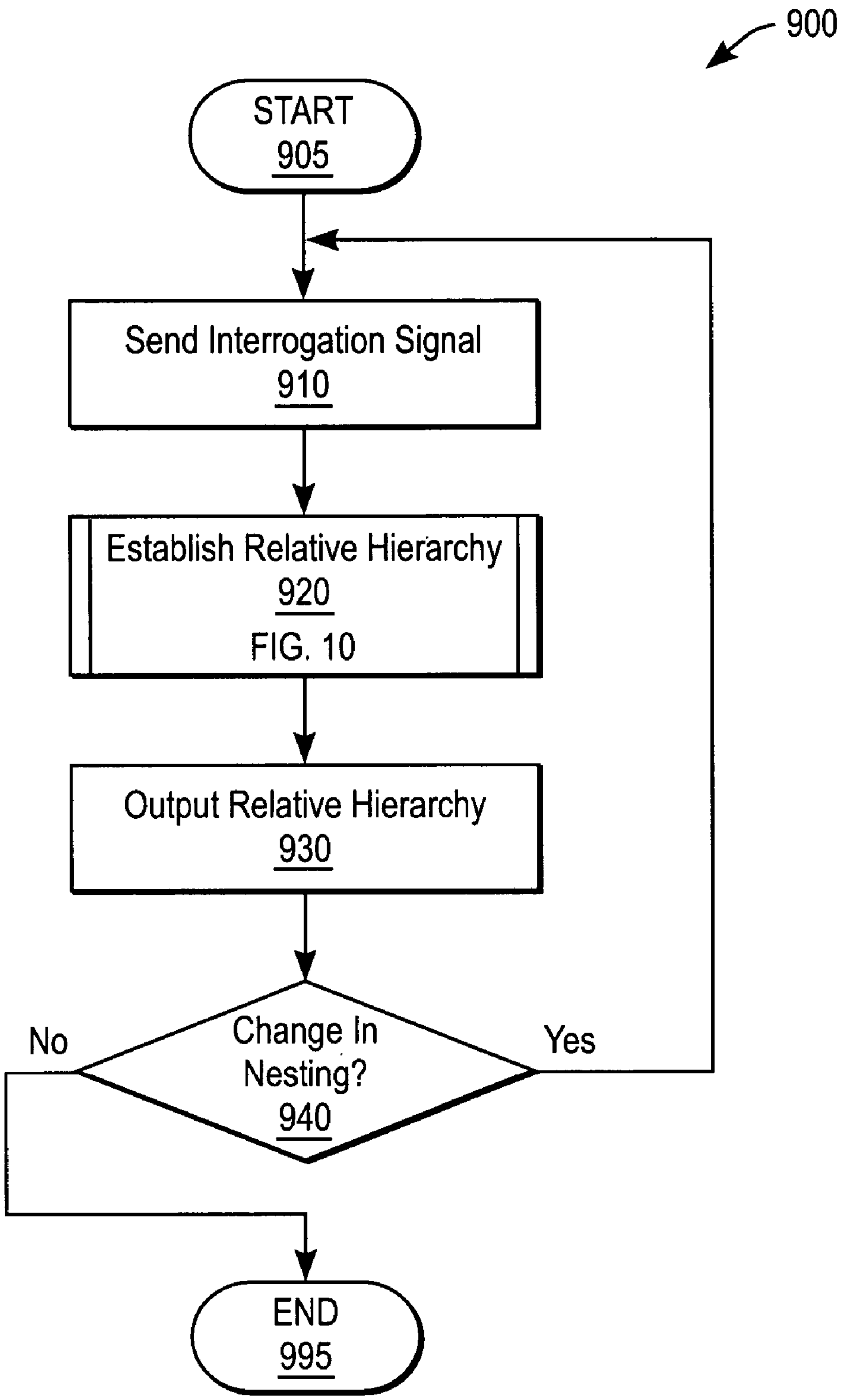
FIG. 9 is a flow chart illustrating a method for providing nested visibility according to one embodiment of the present invention.

FIG. 9 is a flow chart illustrating a method 900 for providing nested visibility according to one embodiment of the present invention. In identification device 220, an interrogation signal is sent 910 by the association module 615 through communication port 620. The interrogation signal invokes a response of identification and layer information from nested and adjacent tags (e.g., 232, 236). In one embodiment, the interrogation signal also includes identification and layer information of the requestor.

The association module 615 establishes 920 a relative hierarchy as discussed further below with respect to FIG. 10. The relative hierarchy based on responses to the interrogation signal provides visibility from that layer. Thus, the identification device 220 can gather and provide information about the nested container 185 and its associated containers.

The communication port 620 outputs 930 the relative hierarchy. The output can be in response to a regular communication with a reader, a specific interrogation signal, or due to a periodic publication to subscribers. The output may be to a portable deployment kit 205, to an agent with a hand-held device, and the like. If there is a change in nesting 940 detected (e.g., by periodic polling), the association module 615 repeats the process by sending 910 another interrogation signal.

Figure 10:
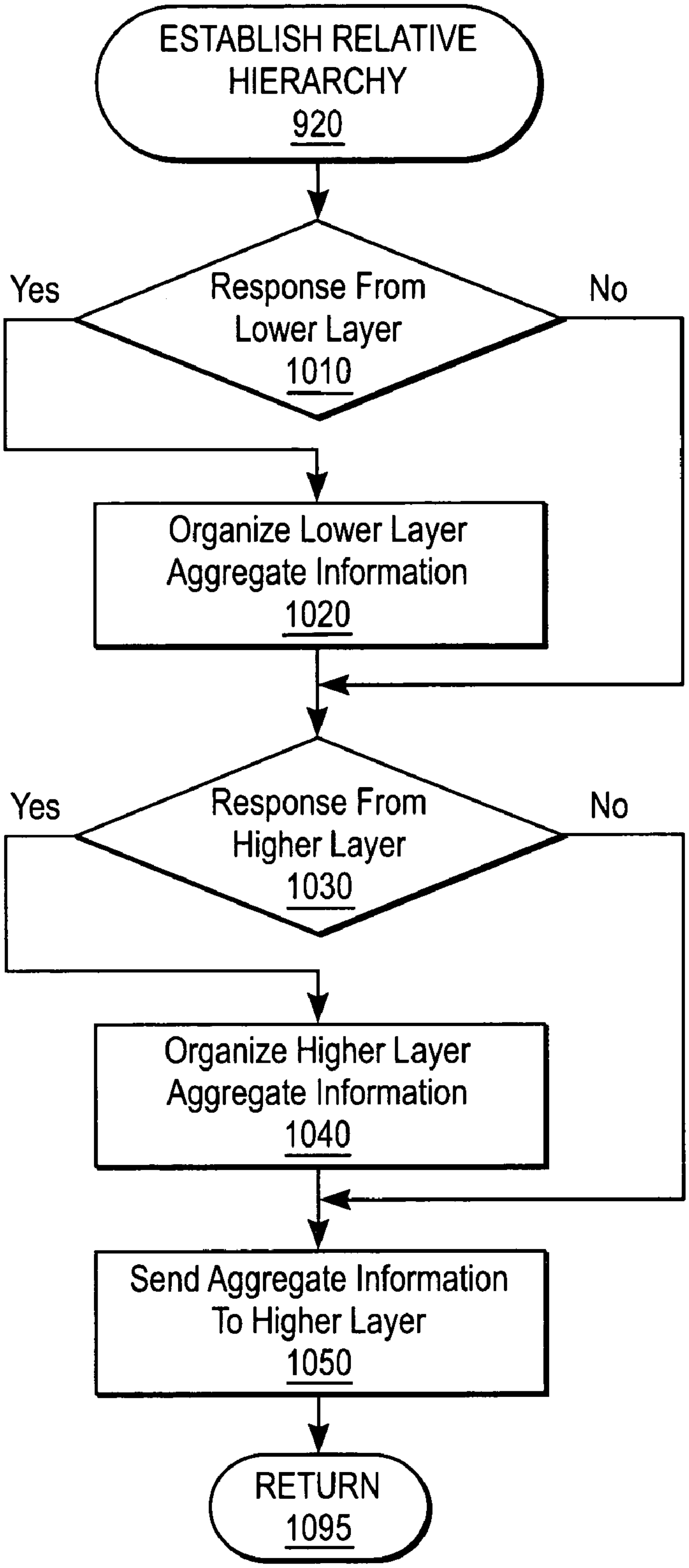
FIG. 10 is a flow chart illustrating a method for establishing the relative hierarchy according to one embodiment of the present invention.

FIG. 10 is a flow chart illustrating the method 920 for establishing the relative hierarchy according to one embodiment of the present invention. The relative hierarchy is based on responses from neighboring nested containers 185. In one embodiment, association information can be preloaded at a checkpoint in the global supply chain 100. If the association module 615 receives responses from lower-layer containers 1010, it organizes 1020 these containers into lower-layer aggregate information. The aggregate information can comprise several layers to delineate a sub-hierarchy.

Likewise, if the association module 615 receives responses from higher-layer containers 1030, it also organizes 1040 these containers into higher-layer aggregate information comprising several layers and a sub-hierarchy. In one embodiment, the association module 615 sends 1050 aggregated information to known higher-layer containers. The association module 615 may also keep information about peer hierarchies that respond to the interrogation signal.

Because a many-to-many relationship exists among layers, some information can be duplicitous. Thus, the association module 615 of one embodiment recognizes and removes duplicitous material. The association module 615 of another embodiment uses duplicitous information for verification or reliability scoring. In one embodiment, the association module 615 resolves conflicting information through various methods such as using the highest-layer information, or using the directly obtained information.

The processes, features, or functions of the present invention can be implemented by program instructions that execute in an appropriate computing device. Example computing devices include electronic tags, enterprise servers, application servers, workstations, personal computers, network computers, network appliances, personal digital assistants, game consoles, televisions, set-top boxes, premises automation equipment, point-of-sale terminals, automobiles, and personal communications devices. The program instructions can be distributed on a computer readable medium, storage volume, or the Internet. Program instructions can be in any appropriate form, such as source code, object code, or scripting code.

The accompanying description is for the purpose of providing a thorough explanation with numerous specific details. Of course, the field of cargo tracking is such that many different variations of the illustrated and described features of the invention are possible. Those skilled in the art will thus undoubtedly appreciate that the invention can be practiced without some specific details described below, and indeed will see that many other variations and embodiments of the invention can be practiced while still satisfying its teachings and spirit. Accordingly, the present invention should not be understood as being limited to the specific implementations described herein, but only by the claims that follow.

We claim:

1. A mobile checkpoint unit in an asset management system, comprising:

a case;

a tag reader, mounted to the case, to receive identification information and layer information from at least one of a plurality of nested containers; and a relative hierarchy module, within the case and in communication with the tag reader, to establish a relative hierarchy within the plurality of nested containers based on the identification information and the layer information, the relative hierarchy being capable of including one or more lower-layer containers and one or more upper-layer containers.

2. The mobile checkpoint unit of claim 1, further comprising:

an external communication unit, mounted to the case and in communication with the relative hierarchy module, to provide data communication between the relative hierarchy module and a regional data collection.

3. The mobile checkpoint unit of claim 1, further comprising:

an external location unit, mounted to the case and in communication with the relative hierarchy module, to receive information related to a location of the mobile checkpoint unit.

4. The mobile checkpoint unit of claim 1, further comprising:

a label printer, mounted to the case and in communication with the relative hierarchy module, to generate a label responsive to the relative hierarchy.

5. The mobile checkpoint unit of claim 1, wherein:

the label printer generates a label that is readable by the tag reader.

6. The mobile checkpoint unit of claim 1, wherein:

the label printer generates a label that reflects at least one of aggregation and deaggregation of the nested container relative to a previous label.

7. The mobile checkpoint unit of claim 1, wherein:

the tag reader is detachable from the case, and wherein the tag reader synchronizes identification information and layer information received when reattached to the case.

8. The mobile checkpoint unit of claim 1, wherein:

the plurality of nested containers comprises one or more from the group containing: an item, a package, a carton, a unit load, a container, and a vehicle.

9. The mobile checkpoint unit of claim 1, wherein:

the plurality of containers comprises an automatic identification technology associated with each container to send the identification information and the layer information.

10. The mobile checkpoint unit of claim 1, wherein:

the relative hierarchy module provides item-layer visibility by including items in the relative hierarchy.

11. The mobile checkpoint unit of claim 1, wherein:

the one or more upper layer containers encapsulates the nested container.

12. The mobile checkpoint unit of claim 1, wherein:

the one or more lower layer containers is encapsulated by the nested container.

13. A self-contained and mobile checkpoint unit in an asset management system, comprising:

means for encasing;

means for reading, mounted to the means for encasing, to receive identification information and layer information from at least one of the plurality of nested containers; and means for associating, within the means for encasing and in communication with the means for reading, to establish a relative hierarchy within the plurality of nested containers based on the identification information and the layer information, the relative hierarchy being capable of including one or more lower-layer containers and one or more upper-layer container.

14. The mobile checkpoint unit of claim 13, further comprising:

means for external communication, mounted to the means for encasing and in communication with the means for associating, to provide data communication between the means for associating and a regional data collection.

15. The mobile checkpoint unit of claim 13, further comprising:

means for external location, mounted to the means for encasing and in communication with the means for associating, to receive information related to a location of the mobile checkpoint unit.

16. The mobile checkpoint unit of claim 13, further comprising:

means for printing, mounted to the means for encasing and in communication with the means for associating, to generate a label responsive to the relative hierarchy.

17. A mobile checkpoint unit in an asset management system, comprising:

a protective case;

a tag reader, mounted to the case, to receive identification information and layer information from at least one of a plurality of nested containers;

a host, within the protective case and in communication with the tag reader, to receive a relative hierarchy within the plurality of nested containers based on the identification information and the layer information, the relative hierarchy being capable of including one or more lower-layer containers and one or more upper-layer containers relative to the at least one of the plurality of nested containers;

an external location unit, mounted to the case and in communication with the relative hierarchy module, to receive information related to a location of the mobile checkpoint unit an external communication unit, mounted to the case, to provide data communication between the relative hierarchy module and a regional data collection; and a label printer, mounted to the case and in communication with the relative hierarchy module, to generate a label responsive to the relative hierarchy.

18. A method for providing a mobile checkpoint unit in an asset management system, comprising:

providing a case;

receiving, in a tag reader within the case, identification information and layer information from at least one of a plurality of nested containers; and establishing, in a relative hierarchy module within the case, a relative hierarchy within the plurality of nested containers based on the identification information and the layer information, the relative hierarchy being capable of including one or more lower-layer containers and one or more upper-layer containers.

* * * * *

UNITED STATES PATENT AND TRADEMARK OFFICE

CERTIFICATE OF CORRECTION

PATENT NO. : 7,307,536 B2
APPLICATION NO. : 11/265831
DATED : December 11, 2007
INVENTOR(S) : David L. Shannon et al.

It is certified that error appears in the above-identified patent and that said Letters Patent is hereby corrected as shown below:

Cover Page, Abstract,
Line 2, please delete “Thee” and insert --These--

Signed and Sealed this

Sixth Day of May, 2008

JON W. DUDAS
*Director of the United States Patent and Trademark Office*